Patented Nov. 27, 1951

2,576,827

UNITED STATES PATENT OFFICE 2,576,827

ACIDIFIED AQUEOUS EMULSIONS OF POLYVINYL ACETATE CONTAINING HYDROQUINONE AND METHOD OF MAKING

William E. Donahue, Pullman, Wash., and Stewart B. Luce, La Grange, Ill., assignors to Swift & Company, Chicago, Ill., a corporation of Illinois No Drawing. Application April 5, 1950, Serial No. 154,192

4 Claims. (Cl. 260—29.6)

The present invention relates to improved film-forming polyvinyl acetate emulsion compositions and methods for preparing the same.

Aqueous emulsions of polyvinyl acetate may be mixed with a suitable plasticizer and dried to form films capable of diversified uses. The polyvinyl acetate films are deficient in the aspect of resistance to water. Several ways have been proposed in the prior art by which the water resistance of polyvinyl acetate films may be improved. For example, a certain amount of improvement has been found to result from the application of heat to the emulsion. Also, there has been included as a component of the film-forming composition some sort of insolubilizing agent, such as dichromates, chromic salts, and various thermosetting water-soluble resins. However, in the use of dichromates and the like, the resulting films are discolored, and in addition the use of these compounds generally requires an elevated temperature to produce satisfactory results. When the thermosetting resins are employed, the resultant mixture has a relatively short "shelf life," and hence must be prepared only slightly before it is to be used.

It is, therefore, an object of the present invention to provide a novel, polyvinyl acetate, film-forming composition in which the disadvantages inherent in the prior art are minimized.

It is a further object of this invention to provide a method for increasing the water resistance of polyvinyl acetate films wherein elevated temperatures are unnecessary.

An additional object of the invention is to provide a method for producing a polyvinyl acetate-containing composition having improved water resistant and keeping qualities.

Additional objects if not specifically set forth herein will be readily apparent to one skilled in the art from the following detailed description of the invention:

Polyvinyl acetate emulsions are white, milky liquids of creamy or watery consistency having a pH in the neighborhood of about 3.5 to 4.0 or above. Such emulsions may be dried directly to form films, or may be first plasticized to cause increased flexibility and toughness of the resultant films by the addition of any of the number of known reagents, such as dicarbitol phthalate, ethyl acetyl glycolate, tricresyl phosphate, dibutyl phthalate, and the like. In the preparation of the polyvinyl acetate emulsion per se, known plasticizers, listed above or elsewhere, may be used if desired.

It has been found that the water resistance of a film formed from a polyvinyl acetate emulsion, either plasticized or unplasticized, may be greatly increased by the addition to said emulsion of sufficient acid to lower the pH of the emulsion from the usual range of 3.5–4.0 to around a pH of 2.0 to 2.5 or even lower. The lower the pH of the mixture, the greater is the water resistance of the resulting film. However, a disadvantage is encountered, particularly in working with a plasticized polyvinyl acetate emulsion, at these low pH values. The viscosity of the emulsion has been found to increase fairly rapidly with decreasing pH. This is undesirable in that it shortens the "shelf life" of the emulsion and makes the subsequent production of films therefrom considerably more difficult. This disadvantage may be overcome, however, by the addition to the acidified emulsion of a small quantity of hydroquinone. The following tables illustrate the effect of acidification upon viscosity and also the effect of the addition of hydroquinone to an acidified emulsion.

Table I

| | Composition | pH | Viscosity in poises @ 73° F. | | | |
| --- | --- | --- | --- | --- | --- | --- |
| | | | Orig. | 1 week | 18 days | 1 month |
| A... | Plasticized polyvinyl acetate emulsion (control). | 4.2 | 13.5 | 13.5 | 15.5 | 18 |
| B... | Composition A plus 1.6% of 3% by volume $H_2SO_4$. | 2.6 | 11.5 | 27 | 100 | 110 |
| C... | Composition B plus 1.5% hydroquinone. | 2.7 | 15 | 20.5 | 28.5 | 32 |

As can be seen from the above table, addition of 1.6% of 3% by volume sulfuric acid, while it reduced the pH to such an extent, e. g., pH of 2.6, that the films formed from the emulsion were greatly increased in their water-resistant properties, (see Table III), also resulted after 1 month in an increase in viscosity of more than 6 times the viscosity of the initial or control sample (A). However, by the addition to an acidified emulsion, such as illustrated by composition C, of only 1.5% by weight of hydroquinone, the increase in viscosity was held down to less than two times the viscosity of the control sample after one month's standing. The percentages given throughout are based on the amount of the emulsion.

Table II

| | Composition | pH after Acidification | Viscosity in poises @ 78° F. | | | |
|---|---|---|---|---|---|---|
| | | | Orig. | 2 wks. | 1 mo. | 10 wks. |
| A | Plasticized polyvinyl acetate emulsion plus 1.6% of 3% by volume H₂SO₄. | 2.45 | 6.2 | 48 | 120 | 178 |
| B | Comp. A plus ½% hydroquinone. | 2.2 | 6.2 | 25 | 41 | |
| C | Comp. A plus 1% hydroquinone. | 2.4 | 6.6 | 26 | 43.5 | 53 |
| D | Comp. A plus 1½% hydroquinone. | 2.2 | 6.8 | 28 | 35 | 53 |
| E | Comp. A plus 2% hydroquinone. | 2.2 | 7.2 | 26 | 32 | 56 |
| F | Comp. A plus 2½% hydroquinone. | 2.2 | 8.7 | 30 | 36 | 60 |

The above Table II shows that the percentage of hydroquinone may be varied considerably. Percentages from ½% to 2½% when added to an acidified, plasticized polyvinyl acetate emulsion gave substantially the same result over a ten-week holding period, cutting the viscosity increase by approximately one-third.

The following brief description of the preparation of a film embodying the present invention is given for the purpose of illustration only. A commercially available polyvinyl acetate emulsion having the following properties was employed as the starting material:

Solids _____ 55% minimum
Viscosity (@ 25° C.) _____ 8-10 poises
Monomeric vinyl acetate _____ 1.0%
pH _____ 4-6

97 grams of the above polyvinyl acetate emulsion were used as a base for the film-forming composition. To this was added 3 grams of dibutyl phthalate plasticizer which was thoroughly dispersed throughout the emulsion by stirring. Next 1.6 grams of 3% by volume sulfuric acid and 0.5 grams of hydroquinone dissolved in 2.0 c.c. water were added and the mixture stirred to thoroughly mix the ingredients. The emulsion was then cast in the conventional manner to form films of the desired thickness. The films were dried at room temperature, although higher or lower drying temperatures could be used and the time required for drying would vary about inversely with the temperature.

Table III

| | Film Composition | pH | Time required for film to disintegrate in water @ 26° C. |
|---|---|---|---|
| A | Plasticized polyvinyl acetate emulsion (control). | 4.7 | 7 hours. |
| B | Composition A plus 1.6% of 3% by volume H₂SO₄. | 1.9 | still intact after 1 week. |
| C | Composition B plus ½% hydroquinone. | ¹2.5 | Do. |
| D | Composition B plus 2½% hydroquinone. | 1.9 | Do. |

¹ Made up at different time than B and D and hence has a different pH.

As can be seen from the above Table III, the film prepared from the untreated control emulsion disintegrated after only 7 hours soaking in water at 26° C. The greatly improved water resistance imparted to the film by the present invention is shown by a comparison of the results achieved with film A and those achieved with films B, C and D.

The acid used to lower the pH of the plasticized emulsion is preferably sulfuric acid as indicated above, but any other mineral acids such as hydrochloric acid or phosphoric acid may be used satisfactorily.

The pH may be varied over quite a wide range. Above 2.5 the water resistance becomes less pronounced and below 1 hydrolysis of the polyvinyl acetate tends to occur. A practical range is a pH of about 2.5 to 1 and preferably around 2.5 to 2.0.

The value of the hydroquinone, as previously mentioned, is not to assist in improving the water resistance of the films produced from the emulsions treated in accordance with this invention, but rather to prevent the rapid increase in viscosity which is attendant upon the acidification of the emulsion, and which in many cases is undesirable. The hydroquinone may be added to the emulsion either before or after acidification, or at the same time the acid is added.

The amount of hydroquinone is limited by the maximum solubility thereof on the one hand and the minimum effective amount on the other hand. The saturation point is around 2.5% at room temperature. Below about 0.5% the effectiveness appears to be appreciably decreased. Therefore, a range of about 0.5 to 2.5% is preferred.

Obviously, many modifications and variations of the invention as hereinbefore set forth may be made without departing from the spirit and scope thereof, and therefore only such limitations should be imposed as are indicated in the appended claims.

We claim:

1. In a method for improving the water resistant properties of films made from a polyvinyl acetate emulsion the step which comprises acidifying said emulsion to a pH of 2.5 or below, and adding to said acidified emulsion a small amount of hydroquinone.

2. In a method for improving the water resistant properties of films made from a polyvinyl acetate emulsion the steps which comprise acidifying said emulsion to a pH of 2.5 or below, and adding to said acidified emulsion from ½% to 2½% by weight of hydroquinone based on the amount of said emulsion.

3. A composition which when dried forms a film having good water resistant properties comprising an aqueous emulsion of polyvinyl acetate having a pH of 2.5 or below and including ½% to 2½% by weight of hydroquinone, based on the amount of said emulsion.

4. A composition as in claim 3 wherein the aqueous emulsion is of a plasticized polyvinyl acetate.

WILLIAM E. DONAHUE.
STEWART B. LUCE.

REFERENCES CITED

The following references are of record in the file of this patent:

UNITED STATES PATENTS

| Number | Name | Date |
|---|---|---|
| 2,320,375 | Moulton | June 1, 1943 |

FOREIGN PATENTS

| Number | Country | Date |
|---|---|---|
| 859,022 | France | May 27, 1940 |